United States Patent Office 3,429,754
Patented Feb. 25, 1969

3,429,754
ALUMINUM CONTAINING POLYMERIC
PROPELLANT COMPOSITION
Gaetano F. D'Alelio, South Bend, Ind., assignor, by direct
and mesne assignments, to Dal Mon Research Co.,
Cleveland, Ohio, a corporation of Delaware
No Drawing. Continuation of applications Ser. No.
751,106, July 28, 1958, Ser. No. 761,485, Sept. 17,
1958, and Ser. No. 762,226, Sept. 22, 1958. This
application June 5, 1961, Ser. No. 125,891
U.S. Cl. 149—19                      20 Claims
Int. Cl. C06b 1/00, 11/00; C06d 5/06

This invention relates to polymers containing aluminum and solid propellent fuel compositions containing such polymers. This application is a continuation of applicant's copending applications Ser. Nos. 751,106, filed July 28, 1958; 761,485, filed Sept. 17, 1958; and 762,226, filed Sept. 22, 1958, each application now abandoned.

Because of the high energy content of such compounds, aluminum compounds having aluminum to carbon bonds, such as aluminum alkyls, have been suggested as fuel compositions. However, because of their tendency to ignite spontaneously upon exposure to air, and the highly reactive nature of these compounds, the use of aluminum alkyls involves considerable danger and necessitates various precautionary steps. Moreover, since they are liquids, their use as propellant fuels for rockets, missiles, and related devices, has the drawbacks common to liquid fuels in that complicated containers and pumping devices are required, and the sloshing effect of the liquids in their containers causes shifting of weight, which adversely affects directional control.

In accordance with the present invention, polymeric compounds having high proportions of aluminum have been discovered which have more easily controlled flammability and reactivity than the aluminum alkyls while still retaining high energy content. Such polymeric materials can be made in the solid state and thereby have the inherent advantages of solid fuels for propelling purposes.

It has surprisingly been found that compositions particularly effective as solid propellant fuels are prepared from 5–95% of solid or liquid oxidizing agent of the type used in solid propellant fuel compositions, such as potassium perchlorate, etc. and 95–5% of a polymer prepared from polyalkenyl ethers having a plurality of unsaturated groups therein, e.g. ethylenic and acetylenic groups, and monoacetylenic ethers, such as divinyl ether, etc., as described more fully hereinafter and aluminum hydrides, and/or their hydrocarbon derivatives, hereinafter referred to generally as aluminum hydride compounds, which can be made to react in such a manner as to produce polymers having aluminum in the polymer chain and in relatively high proportions.

The polymers produced accordingly have a plurality of repeating units of the formula

in the polymer molecules wherein X is R or Y, Y is a polyvalent radical having at least one ether group therein, the remainder of said radical being hydrocarbon, having each of said valencies connected to a carbon atom in said hydrocarbon portion, and having at least 2 carbon atoms between each said valency and said ether group, and R represents hydrogen or a hydrocarbon radical, the hydrocarbon radical preferably containing no more than about 24 carbon atoms. Preferably there are more than 2 such repeating units in each polymer molecule, advantageously more than 4.

The polyunsaturated ethers that can be used in the practice of this invention include those having at least one ether linkage between unsaturated groups. The hydrocarbon derivatives of aluminum hydrides include those in which 1, 2, or more, including all of the hydrogen of an aluminum hydride, is replaced by one or more hydrocarbon radicals, such as aliphatic, aromatic, cycloaliphatic radicals, including combinations thereof, such as aralkyl, alkaryl, cycloalkyl-aryl, aryl-cycloalkyl radicals, etc. The aluminum hydride compounds are reacted with the unsaturated ethers described herein (including those having substituents thereon which are nonreactive to said aluminum hydride compounds), having a plurality of ethylenic or acetylenic groups therein, or only one acetylenic group therein.

Typical aluminum hydride compounds that can be used in the practice of this invention include, but are not limited to, the following: aluminum hydride ($AlH_3$), including its various polymeric forms $(AlH_3)_x$, aluminum alkyl dihydrides, aluminum dialkyl hydrides, aluminum trialkyls, various hydrocarbon derivatives of polymeric aluminum hydrides, etc. These can be used as such, or in complex form with alkali metal hydrides, such as lithium hydrides and sodium hydrides, alkali metal alkyls, ethers, thioethers, tertiary amines, etc.

Specific examples of such compounds include, but are not restricted to, the following: dimethyl aluminum hydride, diethyl aluminum hydride, dipropyl aluminum hydride, dibutyl aluminum hydride, dipentyl aluminum hydride, diphenethyl aluminum hydride, dicyclohexyl aluminum hydride, methyl aluminum dihydride, ethyl aluminum dihydride, propyl aluminum dihydride, butyl aluminum dihydride, pentyl aluminum dihydride, phenethyl aluminum dihydride, 2-ethyl-hexyl aluminum dihydride, cyclohexyl aluminum dihydride, cyclopentyl aluminum dihydride, cyclohexylethyl aluminum dihydride, cyclopentylethyl aluminum dihydride, trimethyl aluminum, triethyl aluminum, tripropyl aluminum, tributyl aluminum, triisobutyl aluminum, tripentyl aluminum, tri (2-ethyl-hexyl) aluminum, tri-phenethyl aluminum, tri-benzyl aluminum, tri-(2-decyl-tetradecyl) aluminum, triphenyl aluminum, tritolyl aluminum, tetramethyl dialuane, trimethyl dialuane, pentamethyl dialuane, symmetrical diethyl dialuane, tetraethyl dialuane, pentaethyl dialuane, etc.

The polymeric products of this invention range from viscous oils to solid thermoplastic or thermoset resins. Depending upon the particular starting materials, modifiers, and polymerization conditions, the polymers range in molecular weight from about 300 to 100,000 and higher. These polymeric compositions are useful as high energy fuels, either as a supplement or as the main component, and are particularly useful in the solid form for such purposes. Particularly useful infusible solid fuels can be made by incorporating a solid or liquid oxidizing agent into the polymeric compositions of this invention while they are in a liquid or thermoplastic state, and then converting the polymer to a crosslinked infusible condition.

It is not intended that the invention be limited to any particular theory, or to any particular formula. It is believed, however, that when a polyalkenyl ether is used having the formula $R_2C=CR-Z-CR=CR_2$, polymers obtained by the practice of this invention can be represented by the formula

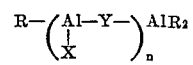

wherein X is R or Y, and Y is a polyvalent radical derived from the polyalkenyl ether and having as many valencies as there are aluminum atoms attached thereto. When derived from dialkenyl ether, Y is a divalent radical. When derived from trialkenyl ether, Y can also be a trivalent radical. Also, in the above formulas, R represents hydrogen or a hydrocarbon group; n is an integer greater than 2, preferably greater than 4; and Z represents oxygen or a divalent group having hydrocarbon and ether oxygen therein with at least one ether linkage between said valencies. The hydrocarbon nucleus of R and Z can have attached thereto substituents which are nonreactive toward the aluminum hydride compound used in the preparation of the polymer. However, additional ethylenic groups can also be attached to R and Z through ether linkages.

While it is believed that each aluminum becomes attached to one of the carbon atoms of an ethylenic group, it is also possible that the aluminum migrates, during or after the reaction between the aluminum compound and the polyalkenyl compound, and is attached to any other carbon atom of the polyalkenyl compound that will give a more stable derivative. Thus, the aluminum may actually be attached to one of the R groups or to Z. For that reason Y is represented as a divalent radical having the formula:

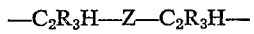

without pinpointing the carbon atoms to which the aluminum is actually attached.

Accordingly, the polymeric products are represented by the formula:

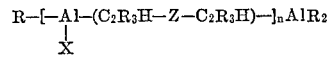

When the aluminum becomes attached and does not migrate from the ethylenic group, the polymeric product can probably be represented by the following formula:

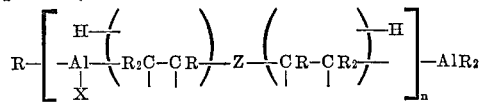

or generally can be simplified, particularly where the ethylenic groups are vinyl or vinylidene groups, to:

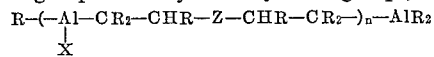

When infusible polymers are obtained by the practice of this invention, the crosslinkages between linear polymer chains, such as represented above when X is Y, can generally be represented by replacing an R group from an aluminum atom in two different polymer molecules and substituting for two such R groups the divalent radical Y which can also be represented as:

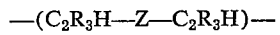

When the aluminum hydride compound has no more than one hydrocarbon group attached to each aluminum atom, such as aluminum hydride, methyl aluminum dihydride, ethyl aluminum dihydride, propyl aluminum dihydride, symmetrical dimethyl dialuane, symmetrical diethyl dialuane, 1,2,3-trimethyl trialuane, etc., and a polyunsaturated compound is used which has two vinyl groups, it is believed that the polymerization generally proceeds linearly, at least initially, as follows:

$RAlH_2 + CH_2=CH-Z-CH=CH_2 \longrightarrow$

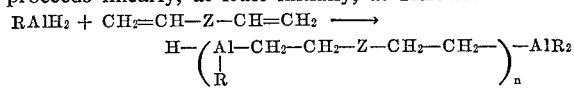

When an aluminum hydride compound which has two or more hydrocarbon groups on each aluminum atom or a linear polymer, such as above, is used in which the R on the aluminum is a hydrocarbon group, at least some of the hydrocarbon groups are displaced by the dialkenyl compound. For example, when the three R's on each aluminum atom are hydrocarbon groups, the polymer is generally believed to proceed linearly, at least initially, as follows:

$AlR_3 + R_2C-CR-Z-CR-CR_2 \longrightarrow$

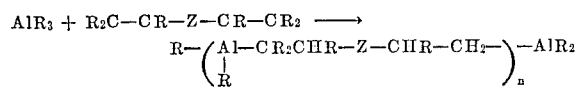

In the preceding reaction when conditions permit, the hydrocarbon group which is replaced by the polyalkenyl compound, generally escapes from the system as an olefin. In cases of closed systems, the buildup of pressure, or reluctance of a radical such as phenyl toward olefin formation, can result in the attachment of the hydrocarbon group to the carbon atom of the ethylenic group other than the one to which the aluminum is attached.

When infusible polymers are obtained by the practice of this invention, the crosslinkages between linear polymer chains, such as represented above, can generally be represented by replacing an R group from an aluminum atom in two different polymer molecules and substituting for two such R groups, the divalent radical Y.

Various modifications of polymeric materials can be made according to the practice of this invention by adjusting the proportions of reactants and the conditions under which the materials are made to react. For example, control of the proportions of reactants enables control over the amount of crosslinking and the amount of polymer formation before crosslinking is effected. Thus, by increasing the proportion of the dialkenyl compound, a higher degree of conversion to polymer can be effected before crosslinking begins. Likewise, the higher the ratio of aluminum compound to polyalkenyl compound, the lower is the degree of conversion before crosslinking takes place. The selectivity, type of reaction, and product, can be controlled somewhat by selecting appropriate aluminum compounds, concentrations thereof, the polyalkenyl compound, and also by the use of certain amounts of monoalkenyl compounds. For example, since the hydrogen in these aluminum compounds is more easily replaced than alkyl groups, it is possible thereby to control somewhat the type and extent of reaction.

On the basis that functionality of the aluminum compound is 3, and that of a dialkenyl compound is equivalent to 2, since each unsaturated group acts as a monoalkylating agent, a rough estimate of the extent of reaction can be calculated from the functionality equation $P=2/F$, where P equals the extent of reaction and F is the functionality of the system. Approximate values derived from such calculations are shown in the following table:

| Aluminum compound (moles) | Dialkenyl compound (moles) | Approximate extent of reaction before crosslinking, percent |
|---|---|---|
| 1 | 4 | 91 |
| 1 | 3 | 89 |
| 1 | 2 | 86 |
| 1 | 1 | 80 |
| 3 | 2 | 77 |
| 2 | 1 | 75 |
| 3 | 1 | 73 |
| 4 | 1 | 72 |

As indicated by these calculations, the higher the mole ratio of the aluminum compound to the dialkenyl compound, the sooner the crosslinking is likely to occur as the reaction proceeds. When a mole of trialkenyl compound, such as triallyl ether of glycerine, or trivinyloxy benzene is reacted with a mole of aluminum compound, $AlR_3$, the value for P approaches 67%, and when the tetra-allyl ether of penta-erythritol is used, the gellation value P approximates 57%.

When it is desired to prepare a thermoplastic resin according to the practice of this invention, either for use as such or for mixture with other materials, or for intermediate treatment prior to conversion to an infusible resin, it is advantageous to use an aluminum compound having one hydrocarbon group per aluminum atom. However, thermoplastic resins can also be prepared by controlling the reaction conditions when unsubstituted aluminum hydrides are used, or when aluminum compounds are used having more than one hydrocarbon substituent per aluminum atom. The preparation of thermoplastic resins can also be facilitated by the use of limited amounts of monoalkenyl compounds which will replace some of the hydrogen on aluminum hydrides, and thereby retard crosslinking until desired, at which time higher temperatures can be used to replace such alkyl groups with the polyalkenyl compound. Thus, when it is desired to control the molecular weight of a linear polymer, or to put terminal hydrocarbon groups on a polymer chain, this can be accomplished by using a mono-olefin, such as ethylene, together with the polyalkenyl compound. The latter can also be effected by using a tri-substituted aluminum, alone or together with an unsubstituted or mono-substituted aluminum hydride.

Some control over the type and extent of reaction can be effected by using aluminum hydride compounds having hydrocarbon groups of different sizes. It is sometimes desirable, also, that the hydrocarbon group to be replaced by the polyalkenyl compound is of a smaller size than the polyalkenyl compound. This is particularly desirable where there is a displaced hydrocarbon group escaping as a byproduct olefin. In such cases a dialkenyl compound of higher boiling point than the resultant olefin permits escape of the olefin upon refluxing of the polyalkenyl compound or upon maintaining the reaction temperature below that at which the polyalkenyl compound vaporizes to an undesirable extent. In some cases, particularly where the difference in volatility is not great, the olefin can be permitted to escape in a stream of the polyalkenyl compound passing through the system, or in a stream of inert gas with additional polyalkenyl compound being fed to the system. In cases where the polyalkenyl compound has a higher vapor pressure than any olefin that might be given off as byproduct, a closed system can advantageously be used to favor the desired displacement.

The temperature conditions for the promotion of polymer formation in accordance with the practice of this invention vary in accordance with the reactivity of the reagents being used. When an aluminum hydride is being reacted with a polyalkenyl compound, a temperature in range of 70°–80° C. is generally suitable. When aluminum hydride compounds containing both hydrogen and hydrocarbon groups are used, the reaction can be controlled mainly to displace the hydrogen by keeping the temperature below 100° C. When hydrocarbon groups are to be displaced from an aluminum hydride compound, a temperature of about 100–120° C. is preferred. Depending upon the decomposition temperature of the particular reagent and the polymeric product, it is generally advantageous not to exceed a temperature of about 140° C. When a mixture of an aluminum hydride and an aluminum hydride compound containing hydrocarbon groups is being used, it is generally desirable to maintain the appropriate temperature until most of the hydrogen has been displaced and then to raise the temperature to that more suitable for displacement of the hydrocarbon group. In some cases the temperature control can be facilitated by the use of an inert solvent, such as heptane, octane, benzene, toluene, xylene, etc., whose boiling point is close to the desired temperature.

The time required for polymer formation varies in accordance with the reactivity of the ethylenic groups in the polyalkenyl compound, the type of group to be displaced in the aluminum hydride compound, the temperature being used, and various other factors which would favor the reaction, such as the use of metal catalysts, such as nickel, cobalt, etc., the removal of the byproduct olefin, etc. With respect to the last condition, an increase in concentration of such byproduct olefin promotes an equilibrium which competes with the progress of the polymer formation. Therefore, unless the olefin is permitted to escape, or it is absorbed by addition, this tends to slow down the polymerization. The polymerization proceeds most rapidly with vinyl groups in the polyalkenyl compound. Vinylidene groups also react rapidly when the second group attached to the doubly substituted carbon is relatively small. With larger groups in that position, longer reaction times and increased temperatures, but still below decomposition temperature, are desirable. Ethylenic groups having hydrocarbon groups attached to both the alpha and the beta carbon atoms are still less reactive than the vinylidene groups, and require longer reaction time even at the more favorable temperature conditions. The time will also vary in accordance with the degree of polymerization required. While the more active reagents can give polymers in even less time, and while some of the higher molecular weight products may require longer periods, many of the polymeric products of this invention can be produced at moderate temperatures in a matter of 12 to 48 hours. In some cases, such as, with the nonreactive type of ethylenic groups, or when low temperatures, for example as low as 50° C., are used, much longer reaction periods are desirable. In such cases the reaction is continued until a solid product is obtained.

While the foregoing discussion uses polyalkenyl ethers for illustration, the same rules also apply to the reaction of ether compounds having one acetylenic group therein, one acetylenic group and one or more ethylenic groups, and also a plurality of acetylenic groups. In such cases, the same conditions apply as described above with two aluminum atoms being added to the carbon atoms of the acetylene group instead of one aluminum being added as with an ethylenic group.

When a high proportion of aluminum is desired in the ultimate product, it is preferred that the unsaturated ether compound be of relatively low molecular weight, generally not over 200 or 300. Typical unsaturated ether compounds that can be used in the practice of this invention include, but are not limited to, the following: divinyl ether, diallyl ether, vinyl allyl ether, propenyl vinyl ether, propenyl allyl ether, divinyl ether of resorcinol, divinyl ether of ethylene glycol, diallyl ether of ethylene glycol, divinyl ether of diethylene glycol, diisopropenyl ether, isopropenyl vinyl ether, isopropenyl allyl ether, isopropenyl butenyl ether, isopropenyl isoamylene ether, divinyloxy benzene, divinyloxy toluene, diallyl ether of resorcinol, diisobutenyl ether of hydroquinone, para-vinyloxy styrene, para allyloxy styrene, trivinyloxy benzene, triallyloxy benzene, tripropenyloxy benzene, vinylphenyl propargyl ether, vinyloxy-phenylacetylene, propargyl vinyl ether, dipropargyl ether, allyloxy-phenylacetylene, propargyl ethyl ether, propargyl phenyl ether, etc.

Also useful in the practice of this invention are polymer having ether groups therein and a plurality of unsaturated groups, e.g. ethylenic and acetylenic groups. Typical polymeric starting materials are polymers of the above listed polyunsaturated ether compounds in which a substantial number of the unsaturated groups therein remain unpolymerized. Preferred polymers of this type are linear polymers in which one of the unsaturated groups in the polyunsaturated ether monomer is polymerized to form a linear carbon chain which has a number of unsaturated groups attached to the linear carbon chain through the ether group of the original monomer compound.

Polymers having pendant vinyl, vinylidene or acetylenic groups, are preferred in the practice of this invention. Typical polymers are those having repeating units of the following types:

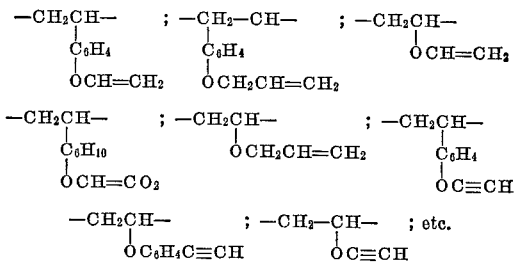

Typical mono-alkenyl modifiers that can be used in the practice of this invention include, but are not limited to, the following: ethylene, propylene, butene-1, butene-2, hexene-1, hexene-2, t-butyl ethylene, 2,4,4-trimethyl-1-pentene, 2,4,4-trimethyl-pentene-2, cyclopentene, cyclohexene, styrene, 1,1-diphenyl ethylene, vinyl cyclohexene, alpha-methyl-styrene, vinyl naphthalene, beta-methyl styrene, allyl benzene, allyl cyclohexane, decene-1, decene-2, decene-3, decene-4, decene-5, dodecene-1, dodecene-2, tetradecene-1, hexadecene-1, cyclopentene, etc.

Various monoalkenyl ester compounds can also be used as modifiers, such as, vinyl ether, vinyl propyl ether, allyl ethyl ether, allyl propyl ether, isopropenyl ethyl ether, isopropenyl propyl ether, etc.

Various methods of practicing the invention are illustrated by the following examples. These examples are intended merely to illustrate the invention and not in any sense to limit the manner in which the invention can be practiced. The parts and percentages recited therein, and also in the specification, unless specifically provided otherwise, refer to parts by weight and percentages by weight. Unless indicated otherwise, the terms "polymer" and "polymeric" are intended to include "copolymers" and "copolymeric."

EXAMPLE I

A mixture of ten parts of triethyl aluminum dissolved in ten parts of heptane is added to three parts of divinyloxy benzene and is heated in an atmosphere of nitrogen to boil off the heptane. The temperature is raised to 100° C. and maintained there. Ethylene is gradually evolved from the reaction mixture. After heating for 48 hours the reaction mixture is a solid mass. The product is washed with heptane to remove traces of unreacted triethyl aluminum. The washed product is stable in air in contrast to the aluminum alkyls which oxidize and burn in air. The product is ground with an equal weight of ammonium perchlorate. The resultant mixture when ignited and tested according to known tests for propellant thrust, shows excellent thrust properties.

EXAMPLE II

Two parts of triethyl aluminum and ten parts of p-vinyloxy styrene are mixed and heated in an atmosphere of nitrogen at 120° C. for 15 hours. A solid, glasslike polymeric mass is formed. The product is ground and washed with heptane and dried. The product does not melt at 200° C., nor spontaneously combust at this temperature. In three different tests, four parts of this polymer are ground individually with six parts of ammonium nitrate, lithium perchlorate, and potassium perchlorate, respectively. In each case the mixture, when ignited, burns very rapidly with an intense white flame, and upon testing for thrust properties, according to known tests for such purpose, the product shows excellent thrust.

EXAMPLE III

Various mixtures of triethyl aluminum and divinyloxy benzene are heated under an atmosphere of nitrogen at a temperature of 120° C. In each case the mixture contains 11.4 parts of triethyl aluminum, and with each experiment a progressively smaller amount of divinyloxy benzene, as follows: 65, 49, 32, 16, 8, 5.5, and 4 parts, respectively. In each case a solid product is obtained, as in Example II, but the time required for the formation of the cake is progressively decreased as lower amounts of divinyloxy benzene are used. In each case the product shows burning properties similar to the product of Example II, and shows excellent thrust properties when burned as such with liquid oxygen, in accordance with known tests for propellant thrust.

EXAMPLE IV

The procedure of Example II is repeated, using 19.6 parts of diallyl ether, and 15.6 parts of tripropyl aluminum, and sealing the mixture under vacuum in a glass tube. The resultant solid product shows similar burning and thrust properties as for the products of Example II.

When the above procedure is repeated, using an equivalent amount of diallyl ether of ethylene glycol, in place of the diallyl ether, and an equivalent amount of triamyl aluminum in place of the tripropyl aluminum, and raising the temperature at the end of the heating period to about 135° C. for an additional 10 hours, similar results are obtained.

EXAMPLE V

The procedure of Example II is repeated, with similar results, using in place of the divinyloxy benzene, an amount of divinyloxy cyclohexane equivalent to the amount of divinyloxy benzene; in another case an equivalent amount of diallyloxy cyclohexane; and in the third case an equivalent amount of p-vinyloxy cyclohexene.

EXAMPLE VI

A mixture of 58 parts of ethyl aluminum dihydride and 190 parts of diallyloxy benzene are heated under an atmosphere of nitrogen at a temperature of 90° C. for five hours, and then at a temperature of 120° C. for an additional fifteen hours. The resultant product, after washing, grinding, and mixing with perchlorate, as in Example II, shows excellent burning and thrust properties similar to those of the product of Example II.

EXAMPLE VII

The procedure of the preceding example is repeated using an equivalent amount of diisopropenyloxy benzene in place of the diallyloxy benzene. Similar results are obtained.

EXAMPLE VIII

Ten parts of aluminum diethyl hydride are heated in an atmosphere of nitrogen to 90°–95° C., and divinyl ether is passed in under reflux at a rate as fast as permitted by the reflux. After ten parts of divinyl ether have been added, and as fast as the reflux rate will permit, the temperature is raised to 125°–130° C., and maintained within that range and under an atmosphere of nitrogen for an additional 24 hours. The resultant solid product, upon treatment and testing as in Example I, shows excellent burning and thrust properties.

EXAMPLE IX

The procedure of the preceding example is repeated using an equivalent amount of ethyl aluminum dihydride. Similar results are obtained.

Similar results are also obtained when the procedure of Example VIII is repeated using diisopropenyl ether in place of divinyl ether in one case, and in another case using diisopropenyl ether and an equivalent amount of ethyl aluminum dihydride in place of the aluminum diethyl hydride.

EXAMPLE X

The following procedure is followed a number of times, using in each case a different mixture as indicated in Table I below. The number appearing before a particular compound, in this table and in subsequent tables, indicates the number of parts by weight of that compound used. In each case the mixture is maintained under an atmosphere of nitrogen at a temperature of 120–130° C. for a period lasting one hour after the reaction mixture has become a solid mass. In each case, the product is processed as in Example I, and upon testing exhibits excellent burning and thrust properties.

TABLE I

| Aluminum hydride compound | Polyalkenyl compound |
|---|---|
| 26 Triphenyl aluminum. | 18 Divinyloxy toluene. |
| 30 Tritolyl aluminum. | 20 Divinyloxy naphthalene. |
| 40 Tristyryl aluminum. | 22 Divinyloxy diphenyl. |
| 30 Tricyclohexyl aluminum. | 18 Divinyloxy cyclohexane. |
| 30 Tri-(beta-cyclohexyl-ethyl) aluminum. | 22 Divinyloxy benzene. |
| 25 Triethyl aluminum. | 22 1,7-divinyloxy-octane. |
| 15 Tripropyl aluminum. | 18 Diisopropenyloxy benzene. |

EXAMPLE XI

The following procedure is followed a number of times, using in each case a different mixture as indicated in Table II below. In each case the mixture is heated under a nitrogen atmosphere at a temperature of 80°–90° C. for five hours, then at a temperature of 120°–130° C. for a period lasting until one hour after the reaction mixture forms a solid mass. The products are processed as in Example I, and each product exhibits excellent burning and thrust properties.

TABLE II

| Aluminum hydride compound | Polyalkenyl compound |
|---|---|
| 30 Styryl aluminum dihydride. | 18 Divinyloxy benzene. |
| 25 Distyryl aluminum hydride. | 22 Divinyloxy naphthalene. |
| 40 Diethyl aluminum hydride. | 45 1,7-diallyloxy octane. |
| 60 Ethyl aluminum hydride. | 90 Diallyloxy cyclohexane. |
| 70 Symmetrical dipropyl dialuane. | 130 Divinyloxy benzene. |
| 60 Tetraethyl dialuane. | 145 Divinyloxy cyclohexane. |

EXAMPLE XII

Various mixtures indicated in Table III below are treated according to the following procedure. The mixture is heated, in each case, under a blanket of nitrogen under reflux, and in accordance with the corresponding increase in reflux temperature. The temperature is gradually increased to 75°–80° C. and maintained at that temperature for approximately five hours. Then the temperature is gradually increased to 120°–125° C. and maintained in that range until the reaction mixture has formed a solid mass, following which the temperature is raised to 130°–135° C. for a period of two hours. The product is processed as in Example I, and, in each case, upon testing exhibits excellent burning and thrust properties.

TABLE III

| Aluminum hydride compound | Polyalkenyl compound |
|---|---|
| 30 Aluminum hydride. | 60 Furane. |
| 15 Aluminum hydride. 60 Triethyl aluminum. | 115 Vinyloxy cyclohexene. |
| 15 Aluminum hydride. 40 Diethyl aluminum hydride. | 140 2-allyloxy-hexene-5. |
| 30 Aluminum hydride. | 100 Diallyl ether. |
| 15 Aluminum hydride. 100 Tributyl aluminum. | 180 Dimethallyl ether. |

EXAMPLE XIII

To a flask equipped with a reflux condenser and nitrogen inlet, is added 0.5 part of divinyl benzene, 1.55 parts of divinyloxy benzene, and 10 parts of triisobutyl aluminum dissolved in 10 parts of heptane. The resultant solution is heated under nitrogen for two days at a temperature of 60° C. At the end of this time, the reaction product is a solid, hard mass. This is broken up and ground with ammonium perchlorate in a proportion of 3 parts of ammonium perchlorate per part of reaction product. The resultant mixture burns vigorously upon ignition and shows excellent thrust properties.

EXAMPLE XIV

The procedure of Example XIII is repeated, using 1.5 parts of divinyloxy benzene, 4 parts of styrene, 0.2 part of diethyl ether, and 5 parts of triisobutyl aluminum dissolved in 5 parts of heptane. The reaction mixture is heated to 60° C. for three days. On the fourth day, the temperature is raised to 110° C., whereupon thickening of the reaction mixture occurs. Upon continued heating, a gel forms by the fifth day. By the end of the sixth day, a waxy, light yellow, solid product is obtained. By grinding with ammonium perchlorate in the proportion of three parts of ammonium perchlorate per part of reaction product, a mixture is obtained which burns vigorously upon ignition and shows excellent thrust properties.

EXAMPLE XV

A mixture of 12 parts of triethyl aluminum and 24 parts of $B(CH_2CH_2OCH=CH_2)_3$ is heated under an atmosphere of methane at 120–125° C. for approximately 48 hours. An insoluble, infusible product is obtained, which is believed to have a plurality of repeating units of the structure:

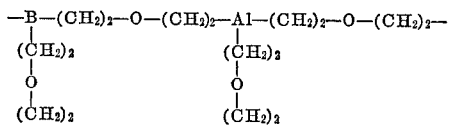

By using equivalent amounts of the corresponding dibutenyl magnesium and dibutenyl beryllium, respectively, in place of the tributenyl borane, and in each case repeating the preceding procedure, two solid products are obtained which are believed to have a plurality of repeating units, in one case of:

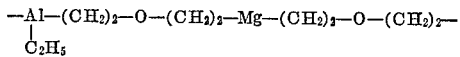

and in the other case of:

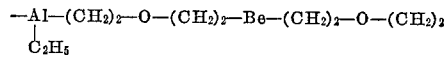

EXAMPLE XVI

A solution of 120 parts p-vinyloxy-phenyl acetylene in 100 parts of cyclohexane is maintained under an atmosphere of nitrogen and at a temperature of 50–55° C. while a solution of 30 parts of aluminum hydride in 100 parts of ether, also under a blanket of nitrogen, is dropped into the cyclohexane solution at such a rate that no more than a 5° rise in temperature occurs. When the temperature rises above 60° C., the aluminum hydride solution is cut off or the rate of addition is reduced until the temperature has subsided to the desired range. During this addition period, the ether is allowed to vaporize from the reaction mass. After all the solution has been added, the heating is continued for a period of two hours, after which the temperature is raised to the solvent reflux temperature for a period of 10 hours. Then the solvent is distilled off and, upon testing, the resultant product shows excellent burning and thrust properties, particularly with potassium perchlorate.

EXAMPLE XVII

A solution of 15 parts of tristyryl aluminum and 15 parts of a solid, soluble polymer of para-vinyloxy styrene in 100 parts of toluene, is heated in an atmosphere of nitrogen at 50° C. for one hour. Then the temperature is raised to 70° C. for two hours, and thereafter refluxed for five hours. The toluene is then distilled off and the reaction mixture heated at 120–130° C. for 24 hours. The solid product is washed with heptane to extract traces of unconverted tributyl aluminum. The washed product is more stable in air than the ordinary organo-aluminum compounds which oxidize and burn in air. The resultant product is ground with an equal weight of ammonium perchlorate. The resultant mixture, when ignited, burns very rapidly with an intense white flame, and when tested according to known tests for propellant thrust, shows excellent thrust properties, particularly with potassium perchlorate.

EXAMPLE XVIII

The procedure of Example XVII is repeated, using 16 parts of a solid, soluble polymer of p-allyloxy-styrene, in place of the vinyloxy-styrene. The product shows similar burning and thrust properties.

EXAMPLE XIX

The following procedure is repeated three times using 100 parts of diallyl ether, 120 parts of divinyl benzene-divinyl ether copolymer (80–20 mole ratio) and 160 parts p-vinyloxy-styrene respectively. In each case the polyunsaturated polymer dissolved in 100 parts of benzene, together with any catalyst or modifier, is maintained under an atmosphere of nitrogen at a temperature of 50–55° C. A solution of 30 parts of aluminum hydride in 100 parts of ether is dropped into the reaction mixture covered by a blanket of nitrogen, at such a rate that no more than a 5 percent rise in temperature occurs. When the temperature rises above 60° C. the aluminum hydride solution supply is cut off or reduced until the temperature has subsided to the desired range. During this addition period, the ether is allowed to vaporize from the reaction mass. After all the solution has been added, the heating is continued for a period of two hours, after which the temperature is raised to the solvent reflux temperature for a period of ten hours. Then the solvent is distilled off and heating continued at 90° C. for an additional 15 hours. The resultant product in each case shows excellent burning and thrust properties.

EXAMPLE XX

A solution of 20 parts of ethyl aluminum dihydride, 150 parts of p-allyloxy styrene, 10 parts of styrene and 150 parts of benzene is heated under an atmosphere of nitrogen at 50° C. for one hour, then at 70° C. for two hours, then refluxed for five hours, following which the benzene is distilled off and the reaction mixture heated at 100° C. for 48 hours. Excellent burning and thrust properties are exhibited when the product is tested, particularly when mixed with potassium perchlorate.

In accordance with the preceding, specific Y groups are illustrated below in the repeating unit given for polymers prepared in the various examples given above. For example the polymers of Examples I and III have repeating units having the formula

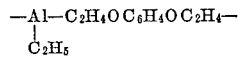

The polymer of Example II has a repeating unit having the formula

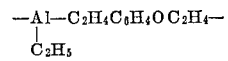

The polymers of Example IV have repeating units respectively of the formulas

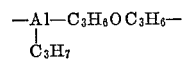

and

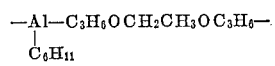

The polymers of Example V have repeating units respectively of the formulas

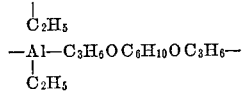

and

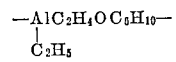

The polymer of Example XVII has repeating units of the formulas

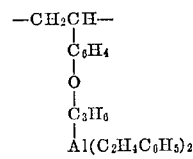

and

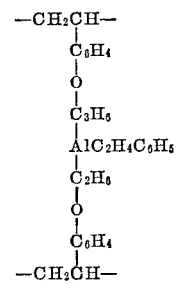

The polymer of Example VI has repeating units of the formula

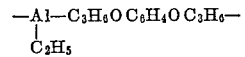

The polymer of Example VIII has repeating units of the formula

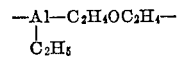

The polymer of Example XVI has repeating units of the formulas

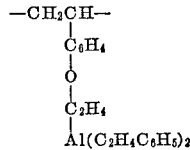

and

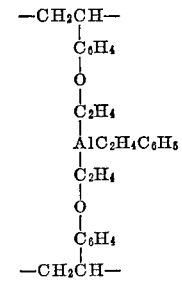

The polymerization described herein can be suspended at an early stage to give low-melting, solid polymers, or in some cases viscous oils, which can be stored as such and the polymerization reaction continued at a subsequent time. In fact, the reaction can be suspended when the product comprises substantially a monomeric product, such as, for example, that derived from an aluminum hydride compound and vinyl ether, namely:

$R_2Al$—$CH_2CH_2OCH$=$CH_2$, $RAl(CH_2CH_2OCH$=$CH_2)_2$ or $Al(CH_2CH_2OCH$=$CH_2)_3$ and the polymerization completed later by the application of heat, or by the addition of aluminum hydride compounds or other reagents, catalysts, modifiers, etc.

Various modifiers can be added to the compositions of this invention after the polymerization is completed, and in cases where the modifiers are nonreactive with the aluminum hydride compounds, can be added prior to the initiation of the polymerization, or at some intermediate stage. Hydrocarbon materials, such as various hydrocarbon resins, e.g. polystyrene, polyethylene, polypropylene, polybutenes, paraffins, etc., can be added at any time. Certain other resins that might influence the reaction, or be reduced, or reacted upon by the aluminum hydride compound, such as those containing ester, amide, or other functional groups, can be added after the polymers are formed. However, if sufficient aluminum hydride compound is added to compensate for that used in such side reactions, such resins can often be added before or during the reaction. Typical resins include, polyethers, such as polymeric vinyl ethyl ether, polymeric vinyl butyl ether, etc.; polyesters, such as polyvinyl acetate, polyvinyl propionate, polyvinyl butyrate, polymethyl methacrylate, polymethyl acrylate, etc.; polyvinyl acetal, polyvinyl butyral, etc., polyacrylonitrile, polyamides, such as nylon and polymeric caprolactam, etc.

Various other polyunsaturated compounds, or acetylenic compounds in addition to those indicated above, can also be added, either before initiation of the polymerization, at an intermediate stage, or at the completion of the polymerization reaction to modify the properties of the products. With regard to the esters, etc., reactive with the aluminum hydride compounds, the same comments apply as made above with respect to resins having ester groups, etc. Such polyunsaturated compounds include: polyunsaturated hydrocarbons, polyunsaturated esters, polyunsaturated ether-esters, and various alkenyl boron compounds formed by the addition of boron alkyls to polyalkenyl hydrocarbon or ether compounds, such as methyl-dibutenyl boron, tris(vinyloxyethyl)boron, etc., and the corresponding beryllium and magnesium derivatives.

Typical examples of such polyunsaturated compounds include, but are not restricted to, the following: 1,3-butadiene, isoprene, 2,3-dimethyl butadiene, pentadiene-1,3, hexadiene - 2,4, octadiene - 2,4, hexatriene - 1,3,5, 2-phenyl-butadiene, 1,3-pentadiene, hexadiene-1,5, 2,4-dimethyl-pentadiene-2,4- vinyl cyclohexene, 1-phenyl-pentadiene-1,3, divinyl cyclohexane, diallyl, 1,6-heptadiene, 1,8-nonadiene, 1,8-decadiene, 2,9-dimethyl-2,8-decadiene, divinyl cyclopentane, divinyl methyl cyclohexane, dipentenyl cyclohexane, allyl cyclohexene, diallyl cyclohexene, divinyl cyclohexene, (beta-vinylalkyl)-furane, (beta-allyl-ethyl)-furane, diallyl cyclohexane, diallyl cyclopentane, dibutenyl cyclohexane, 1,7-diphenyl-heptadiene-1,6, 2,7-diphenyl-octadiene-1,7, divinyl benzene, trivinyl benzene, divinyl naphthalene, trivinyl naphthalene, divinyl diphenyl, trivinyl diphenyl, divinyl toluene, trivinyl toluene, divinyl xylene, divinyl anisole, divinyl ethyl benzene, divinyl chlorobenzene, divinyl methylnaphthalene, divinyl ethyl-naphthalene, divinyl methyldiphenyl, divinyl ethyldiphenyl, divinyl ethoxy naphthalene, divinyl chloronaphthalene, divinyl chlorodiphenyl, divinyl ethoxy diphenyl, vinyl isopropenyl benzene, vinyl isopropenyl naphthalene, vinyl isopropenyl diphenyl, vinyl isopropenyl toluene, vinyl isopropenyl anisole, vinyl isopropenyl chlorobenzene, vinyl isopropenyl methoxy naphthalene, vinyl isopropenyl chloronaphthalene, vinyl isopropenyl methyl chloronaphthalene, vinyl isopropenyl chlorodiphenyl, vinyl isopropenyl methoxy diphenyl, vinyl isobutenyl benzene, vinyl isobutenyl naphthalene, vinyl isobutenyl diphenyl, vinyl allyl benzene, vinyl allyl naphthalene, vinyl allyl diphenyl, vinyl allyl toluene, vinyl allyl anisole, vinyl allyl methylnaphthalene, vinyl allyl chlorodiphenyl, diallyl benzene, triallyl diphenyl, diallyl toluene, diallyl xylene, diallyl chlorobenzene, diisopropenyl benzene, diisopropenyl naphthalene, diisopropenyl diphenyl, diisopropenyl toluene, diisopropenyl anisole, diisopropenyl methyl naphthalene, diisopropenyl chlorodiphenyl, dimethallyl benzene, dimethallyl naphthalene, dimethallyl diphenyl, bis-(alpha-ethyl-ethenyl)-benzene, bis - (alpha-vinyl-ethyl)-benzene, bis - (alpha - vinyl - ethyl) - naphthalene, bis-(alpha-vinyl-ethyl)-diphenyl, vinyl (alpha-vinyl-ethyl)-benzene, vinyl (alpha - vinyl - ethyl) - naphthalene, vinyl (alpha - vinyl-ethyl)-diphenyl, dipropenyl benzene, p-propenyl styrene, para-propenyl isopropenyl-benzene, dicrotyl benzene, dicrotyl naphthalene, dicrotyl diphenyl, dicrotyl anisole, dicrotyl xylene, bis-(4-vinyl-n-butyl)-benzene, bis-(5-isopropenyl-n-hexyl)-benzene, bis-(5 - isopropenyl-n-hexyl)-diphenyl, bis - (5 - methyl-hepten - 5 - yl)-benzene, bis-(5-methyl-nonen-6-yl)-diphenyl, bis - (n-decen-5-yl)-toluene, dicyclopentenyl - naphthalene, di - cyclohexenyl - benzene, acetylene, allene, methyl acetylene, vinyl acetylene, phenyl acetylene, phenylene diacetylene, naphthalene diacetylene, naphthyl acetylene, cyclohexyl acetylene, allyl acrylate, allyl methacrylate, vinyl acrylate, vinyl methacrylate, isopropenyl acrylate, isopropenyl methacrylate, butenyl acrylate, butenyl methacrylate, vinyl crotonate, allyl crotonate, isopropenyl crotonate, propenyl crotonate, isobutenyl crotonate, ethylene glycol diacrylate, trimethylene glycol diacrylate, tetramethylene glycol diacrylate, pentamethylene glycol dimethacrylate, divinyl phthalate, diisopropenyl phthalate, dibutenyl phthalate, divinyl diphenyl-dicarboxylate, diallyl naphthalene-dicarboxylate, diallyl itaconate, divinyl itaconate, divinyl maleate, diallyl maleate, diallyl succinate, diisopropenyl succinate, dibutenyl succinate, divinyl succinate, diallyl adipate, divinyl adipate, diallyl azelate, divinyl azelate, diisopropenyl suberate, divinyl pimelate, diallyl glutarate, diisopropenyl glutarate, divinyl sebacate, diallyl sebacate, diallyl japanate, divinyl octadecanedioate, vinyl 11-acryloxy-undecanoate, allyl 11-methacryloxy undecanoate, isopropenyl 5-crotonoxy-caproate, vinyl 4-acryloxy-caproate, vinyl 11-vinyloxy-undecanoate, allyl 11-allyloxy-undecanoate, vinyl 11-allyloxy-undecanoate, isopropenyl 11-isopropenyloxy-undecanoate, vinyl 5-vinyloxy-caproate, vinyl 5-crotyloxy-caproate, vinyl 5-allyloxy-caproate, allyl 5-allyloxy-caproate, isopropenyl 5-isopropenyloxy-caproate, vinyloxy-tetramethylene acrylate, allyloxy-hexamethylene methacrylate, allyloxy-octamethylene crotonate, isopropenyloxy-octamethylene acrylate, crotyloxy-hexamethylene methacrylate, ethyl diallyl borane, propyl dibutenyl borane, butyl dibutenyl borane, triallyl borane, tetra-allyl diborane, tributenyl borane, tetrabutenyl diborane, dibutenyl magnesium, dibutenyl beryllium, etc.

In addition to the polyalkenyl type of boron, magnesium, and beryllium compounds indicated above, it is desirable in some cases to add monoalkenyl derivatives of such metals and to continue replacement of the remaining hydrogen or saturated hydrocarbon groups on the metal by means of the polyalkenyl compounds or by such compounds which have already partially reacted with aluminum hydride compounds. By these techniques, both aluminum and other metals can be incorporated in polymeric materials.

For many purposes, such as fuel, it is desirable to have a high concentration of the aluminum polymeric units present in the compositions. In such cases, the modifiers are used in minor amounts. However, in certain cases, it may be desirable to use the aluminum composition to modify or fortify the properties of other materials, in which case the aluminum derivatives are used in minor amounts.

As indicated above, the aluminum polymers of this invention are particularly useful as solid fuels. They can be used as the main fuel component or can be added to various types of other fuels to fortify or supplement such fuels. For example, they can be used as additives to gasoline and other motor fuels, to kerosene and other materials used for turbojet engines and jet engines, and can be added to liquid and solid propellant fuels used for rockets, missiles, etc. However, these polymeric compositions are particularly useful as the main fuel component in solid propellant fuels used for rockets and related devices. In such latter cases, it is advantageous to convert the fuel to an infusible form. If modifiers, or auxiliary agents, are to be added, this can be effected before conversion to infusibility. Depending on the particular manner in which the fuel is to be used, it can be in solution, powder, rod, cylinder, or whatever other shape is convenient.

While such products should be made and stored under inert atmospheres, it is surprising that considerable amounts of oxidizing agents can be incorporated into these polymeric compositions and can be stored in inert atmospheres without danger of premature ignition or explosion.

After the desired amount of oxidizing agent has been incorporated into the polymeric composition it can be converted to an infusible form by various means including the addition of more aluminum hydride compounds or the addition of catalyst to catalyze further aluminum-ethylenic addition, the application of moderate heating for similar addition, or effecting crosslinking through the unsaturated groups themselves by heat alone, or by the addition of azo or other free radical-generating catalysts, or by any other means of crosslinking.

Oxidizing agents which can be incorporated in the resin for the ultimate purpose of supporting combustion of the resin and which can be incorporated in accordance with safety conditions determined by their reactivity, include: the solid and liquid perchloryl aryl compounds of the formula $Ar-Cl-O_3$, such as perchloryl benzene, perchloryl toluene, etc., various perchlorates, nitrates, oxides, persulates, and perborates of metals and ammonia, such as ammonium perchlorate, potassium perchlorate, sodium perchlorate, ammonium nitrate, potassium nitrate, sodium nitrate, potassium permanganate, potassium chlorate, manganese dioxide, potassium iodate, potassium dichromate, chloric acid, perchloric acid, ammonium persulfate, ammonium dichromate, ammonium iodate, aluminum nitrate, barium chlorate, barium perchlorate, barium permanganate, lithium perchlorate, lithium dichromate, lithium permanganate, etc.

Some of these oxidizing agents are not self-sustaining oxidizing agents, and can be used when free oxygen, or compositions such as perchloryl fluoride, highly concentrated hydrogen peroxide, etc., which generate oxygen in situ, are passed in surface contact with the fuel. The liquid oxidizing agents can be incorporated with precautions to assure uniform distribution through the polymer mass and to avoid ignition or explosive conditions during preparation and use of the fuel. It is desirable that the products from reaction of the oxidizing agent and the resin are gaseous in their normal state so that the energy developed in the system will not be robbed of energy to convert them to the gaseous state.

It is generally desirable that the fuel be molded in the shape in which it is ultimately to be used before the composition is converted to an infusible state. In fact, the fuel can even be cast or molded as one entire unit which will comprise the entire fuel load for one rocket and can be substantially as long as the rocket if desired. Therefore, the size is limited only by the size of the rocket in which it is to be used.

It is possible to make the fuel in other shapes than indicated above and have the fuel machined to give the desired shape. For example, cylindrical shapes are generally desirable with an opening running through the cylinder along its linear axis. If desired, there can be a plurality of such openings running through the length of the mass so that more than one oxidizing stream can function simultaneously. However, various other shapes can be used, such as blocks having rectangular or square cross sections with one or more openings running along the linear axis of the block.

While the aforementioned shapes are preferred, it is also possible to use smaller units or shapes made by the practice of this invention, and then to assemble them in a space or container advantageously in such a manner that one or more open linear paths are left through the assembled mass so that the oxidizing gas and/or the combustion gases can be passed therethrough. For example, the fuel can be in the shape of discs with an opening in the center, or in half or quarter discs, or even with rectangular, square, or various other cross-sections so that upon assembly, one or more openings for the oxidizing gas are formed through the assembled mass. A cylindrical mass can be made of a number of concentric cylinders for which the outer diameter of one is slightly less than the diameter of the inside linear opening of another so that the assembled cylindrical mass actually comprises a number of cylindrical sleeves which fit over one another. The axial opening of the one having the smallest diameter would be the linear axis opening of the assembled mass.

In addition to the foregoing, the resin-oxidizing agent composition can be made in various other shapes, depending on the manner in which it is ultimately to be used. As a further example, it can be shaped as a solid rod, in which case the burning surface will be the outer surface of the rod or cylinder. The outer surface of the rod can be ignited and if a supplementary oxidizing fluid is used, this can be directed against such outer surface of the rod. If desired, the rod can be advanced through an opening in accordance with the desired rate at which the surface is to be exposed to a supplementary oxidizing fluid. The composition can also be shaped in the form of granules, pellets, etc., where it is desired to modify the surface area that is to be exposed for combustion. Such granules can be used as such, or can be adhered to metal surfaces in accordance with the present known art in the use of solid propellant fuel in granular form.

When the oxidizing agent to be added is a solid, it is desirably in fine particle size so as to permit substantially uniform distribution throughout the mass. The oxidizing composition which is to be passed in surface contact with the fuel is of the type generally used presently, such as pure or highly concentrated oxygen. The upper limit in the amount of oxidizing agent to be used is determined by the concentration that can safely be used under the conditions ultimately existing in the fuel zone of the rocket, or by that excess over the stoichiometric amount required for complete combustion of the fuel, whichever limit is reached first. Obviously, the safety limit will vary according to the type of auxiliary oxidizing agent used. The type of fuel base material used together with its heat capacity and heat transmission properties, the temperature which will exist in the preparation and use of the fuel, etc.

Since the fuel composition of this invention can be used according to various methods, varying from the use of a substantial amount of supplemental oxidizing fluid to that in which the combustion is self-sustained by the oxidizing compound contained in the fuel, the minimum amount of such oxidizing agent contained in the fuel will depend on the manner in which the fuel is to be used. When the combustion is to be maintained partly by an oxidizing agent in the fuel and partly by the oxidizing agent pumped through the opening, then obviously the supplemental effect of one agent toward the other will depend on the particular material being used as the oxidizing agent in the fuel and on the particular oxidizing fluid being fed through the opening.

Moreover, in each case the relative amounts cannot be determined on a weight basis but must be determined on the basis of the amount of oxygen available in the particular oxidizing agent used to support the combustion. This depends on the oxygen content of the oxidizing agent and the percent of that oxygen that is liberated for oxidizing purposes upon decomposition of the oxidizing agent. Furthermore, this depends somewhat on the efficiency with which its is desired to consume the fuel. For example, it might be desirable to have a considerable excess of oxidizing agent so as to consume the fuel more completely, even though it might mean an inefficient use of the oxidizing agent. Again, it is permissible to use the fuel with a low efficiency for use of B.t.u. content, then it may be desirable to use a smaller amount of oxidizing agent.

The amount of oxidizing agent inbedded in the fuel itself can be further decreased when a supplemental oxidizing fluid is being pumped into contact with the fuel. Obviously, therefore, the proportion of oxidizing agent imbedded in the fuel base material can vary from 5 percent to approximately 95 percent depending on the various factors involved, such as the efficiency desired, the method and convenience of operation, and the materials being used. Generally, when an oxidizing agent is imbedded in the base material, it is advantageous to use from about 5 percent to 95 percent, preferably about 20 percent to about 75 percent based on the combined weight of oxidizing agent, base material, and any crosslinking modifier that is used.

When an oxidizing agent is used in the fuel base material of the type and in the amount that will be self-sustaining in the combustion of the fuel base material, there will be no need to use an oxidizing fluid on the surface of the fuel. In such cases, the combustion of the fuel is initiated by igniting it by various means presently used for that purpose, such as a mixture of hydrazine, or unsymmetrical dimethyl hydrazine, and nitric acid, or by triethyl aluminum and oxygen, or by a torch, or by an electrical ignition system. When the oxidizing agent is not present in self-sustaining amount, liquid oxygen or an efficient oxidizing compound such as perchloryl fluoride ($FClO_3$) can be pumped into contact with the surface of the fuel to supply the oxygen for combustion. In some cases highly concentrated hydrogen peroxide, such as 98 percent hydrogen peroxide can be used to supply oxygen for combustion.

When a self-sustaining oxidizing agent is distributed throughout the fuel, the desirable amount can be determined by calculating the stoichiometric equivalent required for combustion of the fuel, and adjusting the calculation by subtracting, where less than 100 percent efficiency is satisfactory, or adding, where desired, an excess to compensate for the lack of 100 percent efficiency in the actual combustion. Since the conditions of operation do not permit the time and type of mixing which give 100 percent efficiency, where other factors permit, it is sometimes desirable to have an excess of oxidizing agent which will give 50 percent, or even as high as 100 percent more than the stoichiometric amount of oxygen. When it is permissible or desirable to sacrifice some of the efficiency of the B.t.u. content of the fuel, the stoichiometric amount or even less than that amount of the oxidizing agent can be used, depending on the fuel efficiency desired.

The oxidizing agent and/or modifier can be introduced or suspended in the solid fuel in any convenient or appropriate manner. The mixture can be effected mechanically as on mixing mils, on a Banbury mixer, any single or double worm extruder, or by rotation of the mold when the material is being cast from a liquid state. When a solid is to be added, the thermoplastic material can desirably be softened by the addition of a softening agent, or, as indicated above, by the modifier itself. Such compounded mixtures can then be extruded, or otherwise shaped into the desired form and then polymerized to infusibility. In some cases, depending on the particle size of the solid oxidizing agent and the amount of void space between particles, the polymer in liquid state, or the monomer from which it is to be prepared, together with a polymerization catalyst of the peroxy or azo type, can be poured into a container holding the solid oxidizing agent and thereby fill the void spaces. Then upon standing at room temperature, or at slightly raised temperatures, the polymer or monomer will be converted to an infusible state with the oxidizing agent embedded therein.

However, whichever method of mixing is used, it is desirable to avoid the generation of heat that will raise the temperature to the ignition point of the oxidizing agent. Therefore, in some cases, it is desirable to precool the materials to be mixed or to provide means to withdraw the heat as it is generated.

While certain features of this invention have been described in detail with respect to various embodiments thereof, it will, of course, be apparent that other modifications can be made within the spirit and scope of this invention, and it is not intended to limit the invention to the exact details shown above except insofar as they are defined in the following claims:

The invention claimed is:

1. A polymeric composition useful as a solid propellant fuel consisting essentially of 5–95 percent by weight of an oxidizer selected from the class consisting of perchlorates, nitrates, persulfates and perborates of sodium, potassium and ammonia, potassium chlorate, manganese dioxide, potassium iodate, potassium dichromate, chloric acid, perchloric acid, ammonium dichromate, ammonium iodate, barium chlorate, barium perchlorate, barium permanganate, lithium perchlorate, lithium dichromate, lithium permanganate, and aryl perchloryl compounds and 95–5 percent by weight of a polymer having a plurality of repeating units in the polymer molecule thereof having a formula

wherein X is a group selected from the class consisting of R and Y groups, R is a radical selected from the class consisting of hydrogen and hydrocarbon radicals having no more than 24 carbon atoms therein, and Y is a polyvalent radical consisting of hydrocarbon and ether portions, said valencies being connected to hydrocarbon portions thereof and having at least 2 carbon atoms between said valency and each ether group therein.

2. A polymeric composition of claim 1 in which said polymer has a plurality of repeating units in the polymer molecule thereof having the formula

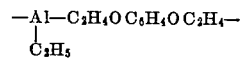

3. A polymeric composition of claim 1 in which said polymer has a plurality of repeating units in the polymer molecule thereof having the formula

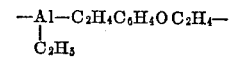

4. A polymeric composition of claim 1 in which said polymer has a plurality of repeating units in the polymer molecule thereof having the formula

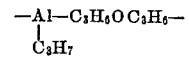

5. A polymeric composition of claim 1 in which said polymer has a plurality of repeating units in the polymer molecule thereof having the formula

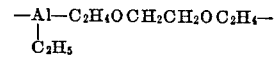

6. A polymeric composition of claim 1 in which said polymer has a plurality of repeating units in the polymer molecule thereof having the formula

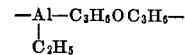

7. A polymeric composition of claim 1 in which said polymer has a plurality of repeating units in the polymer molecule thereof having the formula

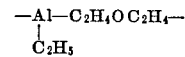

8. A polymeric composition of claim 1 in which said polymer has a plurality of repeating units in the polymer molecule thereof having the formula

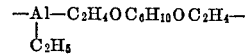

9. A polymeric composition of clim 1 in which said polymer has a plurality of repeating units in the polymer molecule thereof having the formula

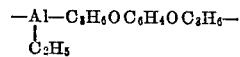

10. A polymeric composition of claim 1 in which said oxidizer is potassium perchlorate.

11. A polymeric composition of claim 1 in which said oxidizer is ammonium perchlorate.

12. A polymeric composition of claim 1 in which said oxidizer is an aryl perchloryl compound.

13. A polymeric composition of claim 1 in which said oxidizer is perchloryl benzene.

14. A polymeric composition of claim 1 in which said oxidizer is lithium perchlorate.

15. A polymeric composition of claim 1 in which said oxidizer is sodium perchlorate.

16. A polymeric composition of claim 1 in which said oxidizer is potassium perchlorate and said polymer has a plurality of repeating units in the polymer molecules thereof having the formula

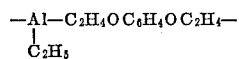

17. A polymeric composition of claim 1 in which said oxidizer is potassium perchlorate and said polymer has a plurality of repeating units in the polymer molecules thereof having the formula

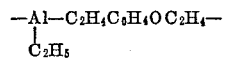

18. A polymeric composition of claim 1 in which said oxidizer is potassium perchlorate and said polymer has a plurality of repeating units in the polymer molecules thereof having the formula

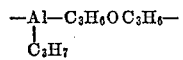

19. A polymeric composition of claim 1 in which said oxidizer is potassium perchlorate and said polymer has a plurality of repeating units in the polymer molecules thereof having the formula

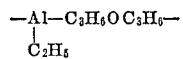

20. A polymeric composition of claim 1 in which said oxidizer is potassium perchlorate and said polymer has a plurality of repeating units in the polymer molecules thereof having the formula

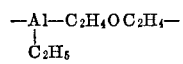

References Cited

UNITED STATES PATENTS

| | | | |
|---|---|---|---|
| 2,844,551 | 7/1958 | Orthner et al. | 260—18 |
| 2,924,614 | 2/1960 | Reuter | 260—448 X |

BENJAMIN R. PADGETT, *Primary Examiner.*

U.S. Cl. X.R.

149—1, 20; 60—220